Jan. 30, 1968  E. BALLIGAND  3,365,868

APPARATUS FOR REMOVING LEAVES FROM BEETS

Filed Nov. 2, 1964

INVENTOR
EMILE BALLIGAND
BY Cushman, Darby & Cushman
ATTORNEYS

United States Patent Office 3,365,868
Patented Jan. 30, 1968

3,365,868
APPARATUS FOR REMOVING LEAVES FROM BEETS
Emile Balligand, Jemeppe-sur-Sambre, Belgium, assignor to Société Anonyme Societer, Orp-le-Grand, Belgium, a Belgian company
Filed Nov. 2, 1964, Ser. No. 408,223
Claims priority, application Belgium, Nov. 8, 1963, 512,914
7 Claims. (Cl. 56—121.43)

The invention relates to an apparatus for removing leaves from beets before they are uprooted, this apparatus being distinguished from conventional topping machines in that it cuts the leaves and cleans the neck instead of simply decapitating the latter.

According to the invention, the apparatus comprises two rotors provided with cutters, the first of which rotates at a fixed distance from the ground in order to chop off the foliage above the neck of the beet, and the second of which rotates at a variable distance from the ground and is adapted to cut the stumps of the leaves still adhering to the neck. The first rotor rotates about a fixed shaft of a chassis, whereas the second rotor rotates about a shaft carried by the free end of swingable arms. The chassis can roll or slide on the ground, but it may also be supported by a tractor. Preferably, the two rotors are to be mounted on a common chassis, but each of them may also be placed on a separate chassis, either arrangement being within the contemplation of the invention.

The swingable arms are capable of being lowered with the second rotor towards the ground and are provided at their free end with means preventing the cutters of this rotor from touching the ground. According to the invention, the second rotor comprises means such as discs fitted on the shaft carried by the free end of the arms. When the apparatus moves along a line of beet plants, these discs act so that the rotor mounts on the projecting portion of a beet when it comes into contact with the said beet, passes over its neck, where the cutters cut off the stumps of leaves left by the first rotor, and descends at the other side, avoiding damaging the beet by the cutters.

In one embodiment of the invention, the discs of the second rotor are mounted on a rigid shaft, so that the rotor is non-deformable and that when cutting the leaf stumps the cutters plane-off the neck of the beet along a convex surface. In another embodiment, the discs of the second rotor are mounted on a flexible shaft constituted for example by a coil spring tensioned between the free ends of the arms. Each disc then carries cutters co-operating with those of the neighbouring disc. The rotor is deformed by the contact of one of the discs with a beet and the neck is thus planed-off in a domed form by the cutters when they cut the leaf stumps.

The two rotors are driven in rotational movement, for example, by means of a transmission of the endless chain type; preferably the second rotor rotates at a higher speed than the first rotor.

The accompanying drawings show by way of example several forms of the invention.

Figure 1:
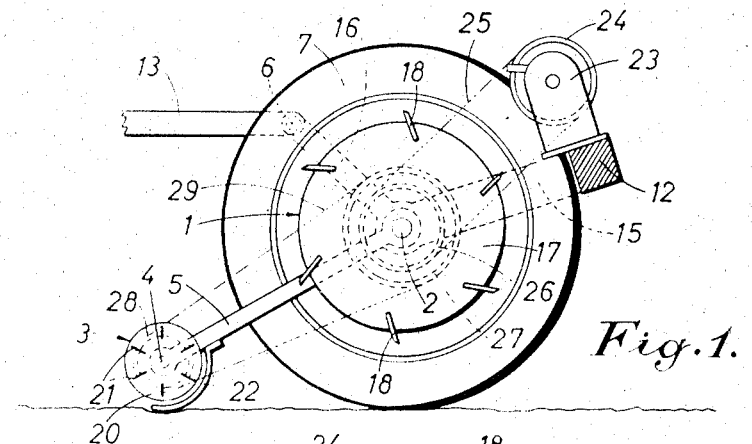
FIGURE 1 is a diagrammatic sectional view showing an apparatus mounted on two wheels.
Figure 2:
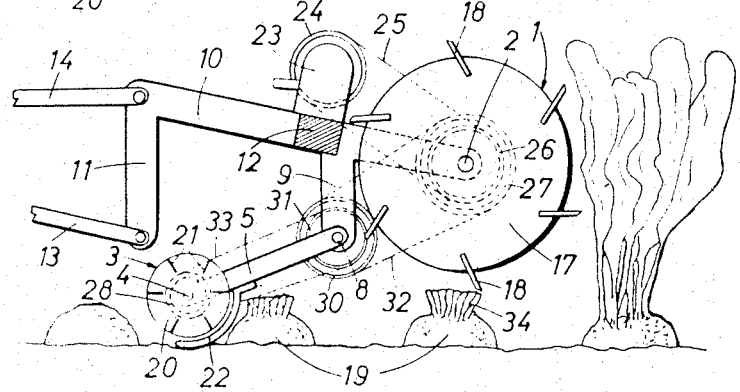
FIGURE 2 is a diagrammatic sectional view of an apparatus intended to be supported by a tractor.
Figure 3:
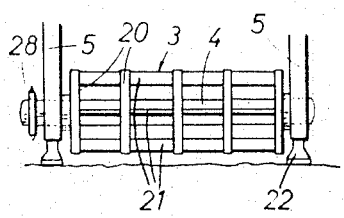
FIGURE 3 is a front view of a rotor capable of cutting leaf stumps.

In the embodiment shown in FIGURES 1 and 2, the apparatus for removing leaves from beets comprises a first rotor 1 rotating about a fixed shaft 2 at a fixed distance from the ground and a second rotor 3 rotating on a shaft 4 at a variable distance from the ground.

This shaft 4 is carried by swingable arms 5 which are pivotably mounted on a shaft situated at a fixed distance from the ground. In the case of FIGURE 1, this shaft is constituted by the axle of a carriage with pneumatic-tired wheels 7, the rotor 1 rotating also about this axle, whereas in the case of FIGURE 2 the swingable arms are pivotably mounted on a shaft 8 situated below the arms 9 fixed on the longitudinal members 10 which have an elbowed portion 11. These longitudinal members are connected to one another by a cross-bar 12 to form a chassis on the end of which the rotor 1 rotates about the shaft 2. This chassis is intended to be supported by the entrainment arms 13 of a tractor (not shown) and held in the desired position by the rod 14 of a jack of the said tractor, or by some other similar means such as a chain. Thus, the rotor 1 can rotate at a fixed height but a height which can be regulated in accordance with needs. The carriage (FIGURE 1) comprises a U-shaped chassis constituted by longitudinal members 15 and a cross-member 12. On the ends of the longitudinal members there are provided elbowed portions 16 to which there are pivotably connected at 6 the entrainment arms 13 of the tractor.

The first rotor comprises between the end discs 17 cutters 18 which travel over a circular course about the shaft 2. These cutters, shown in the form of thin blades, are arranged so as to pass several centimetres above the neck of the beet plants 19. The second rotor is constituted by a certain number of discs 20 arranged on the shaft 4, between which extend cutters 21 placed in radial slots in the discs so that the cutters are substantially flush with the periphery of the discs or very slightly within the periphery, in order to avoid any damage to the projecting portion of the beet. In order to prevent the discs and the cutters from touching the ground, the mobile arms 5 are provided at their free end with shoes 22.

The two rotors 1 and 3 are driven by a transmission controlled by a power-take-off of the tractor by means of a flexible shaft (not shown) terminating in a box 23 which is mounted on the cross-bar 12, and whose output shaft carries a toothed wheel 24 driving by means of a chain 25 the toothed wheel 26 which is fast with the rotor 1. A toothed wheel 27 which is also fast with the rotor 1 drives the toothed wheel 28 of the second rotor, either directly by means of a chain 29 (FIGURE 1), or through the agency of a pair of toothed wheels and intermediate chain wheels 30, 31 (FIGURE 2), mounted fast on the shaft 8, and chains 32 and 33. The two rotors can rotate at the same speed; however, the second rotor will preferably rotate more quickly than the first.

If the apparatus described is advanced along a line of beet plants, either mounted on the front of a tractor or pushed by means of a tractor, the cutters of the first rotor chop the leaves off the beet plants, cutting them a short distance from the top of the body of the beet. The second rotor climbs on to the projecting portion of the beet when one of the discs 20 comes into contact with the beet, and the cutters 21 cut the leaf stumps 34 and at the same time clean the neck of the beet by planing it off slightly along a convex surface. The second rotor then descends toward the ground and ascends again onto the projecting portion of the following plant.

Figure 4:
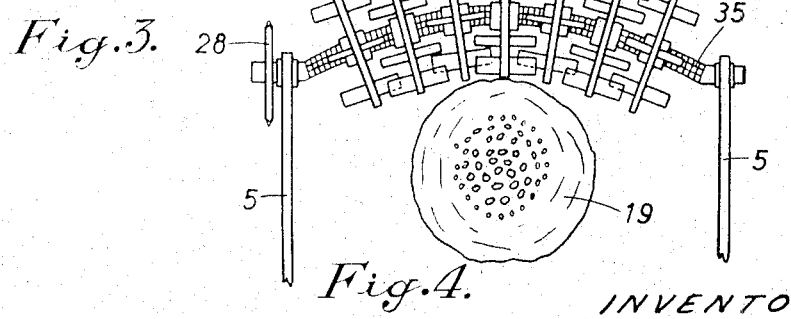
FIGURE 4 is a plan view of a rotor similar to a flexible shaft.

In order to enable the neck to be shaved off to a domed shape, instead of a rigid shaft 4 a flexible shaft 35 may be provided (FIGURE 4) which rotates at the free end of the mobile arms 5 and is driven by the toothed wheel 28 of the transmission system. The discs 20 are mounted on the flexible shaft and each carry sections of cutters 36 acting in co-operation with sections of cutters 36′ of a neighbouring discs 20'. The sections of cutters 36 and 36' are offset relatively to one another by a certain angle, for example 30° when each disc carries six sections of cutters. The flexible shaft is deformed when one of the discs abuts against a beet. This deformation is maintained by the influence of the weight of the rotor and the swingable arms when the rotor crosses the upper portion of the beet where the portions 36 and 36' constitute together curved cutting edges which cut the leaf stumps and plane the neck to a domed shape.

As compared with conventional topping machines which only decapitate the beet plants below the neck, to which the foliage continues to adhere, the apparatus according to the invention affords the advantage of making it possible to supply the sugar refinery with complete beets, thus making it possible to increase the weight of the units supplied substantially. Furthermore, the beets are substantially intact and do not have the considerable wounds caused by the conventional topping operations which promote considerable losses of sugar by dialysis when the beets have to be stocked in humid weather before it is possible to pass them on to the factory.

The invention is not, of course, limited to the precise forms which have been described and illustrated by way of example, and modifications could be made thereto without departing from the framework of the said invention.

I claim:

1. Apparatus for removing leaves from beet plants comprising a first rotor provided with a plurality of cutting elements adjacent to the outer periphery thereof, a second rotor trailing said first rotor and similarly provided with cutter elements adjacent to the outer periphery thereof, said second rotor having a transverse axis shaft carried by free ends of arms swingable about the axis shaft of said first rotor and said swingable arms provided adjacent their free ends with means for spacing the cutting elements of said second rotor from the ground surface, said first rotor adapted to rotate about an axis at a fixed distance from the ground so as to sever and remove the foliage above the necks of beet plants, said second rotor adapted to rotate about said transverse axis at a variable distance from the ground so as to follow said first rotor and sever the stump of the foliage stalk from the root portion of said beet plants, without substantial removal of said root portion.

2. Apparatus according to claim 1 wherein said second rotor comprises a plurality of annular members spaced along said transverse axis and fixed to said axis so as to be rotatable therewith and said cutting elements are carried by said rotor so that the cutting surfaces thereof are disposed within the periphery of adjacent annular members, whereby said annular members contact and move over the projecting root portion of a beet plant, preventing said cutting elements from removing a substantial amount of said root portion.

3. Apparatus according to claim 2 wherein said annular members comprise fixed concentric discs and said cutting elements are carried in parallel relation recessed into the outer circumference of said discs.

4. Apparatus according to claim 1 wherein said second rotor comprises a plurality of annular members spaced along said transverse axis and fixed to said axis so as to be rotatable therewith and said cutting elements are carried by said rotor so that the cutting surfaces thereof are disposed on the periphery of adjacent annular members, whereby said annular members contact and move over the projecting root portion of a beet plant preventing said cutting elements from removing a substantial amount of said root portion.

5. Apparatus according to claim 2 wherein said annular members comprise fixed concentric discs so that the cutting surfaces thereof are flush with the periphery of said discs.

6. Apparatus according to claim 1 wherein said second rotor comprises a plurality of annular members spaced along said transverse axis so as to be rotatable therewith, and said axis comprises a flexible shaft so that the shaft is deformed as the annular members pass over the root portion of the beet plants, whereby said annular members contact and move over the projecting root portion of a beet plant, preventing said cutting elements from removing a substantial amount of said root portion.

7. Apparatus according to claim 6 wherein said annular members comprise rigid concentric discs and said cutting elements comprise segmented cutters fixed to said discs.

References Cited

UNITED STATES PATENTS 835,600 11/1906 Chambers _____ 56—121.43

ANTONIO F. GUIDA, *Primary Examiner.*

ABRAHAM G. STONE, *Examiner.*